United States Patent [19]

Saito et al.

[11] Patent Number: 5,153,167
[45] Date of Patent: Oct. 6, 1992

[54] HONEYCOMB CATALYST CARRIER

[75] Inventors: Tohru Saito; Hiroshi Iwami; Yasushi Ishikawa, all of Sagamihara, Japan

[73] Assignee: Nippon Steel Corporation, Tokyo, Japan

[21] Appl. No.: 704,179

[22] Filed: May 22, 1991

[51] Int. Cl.$^5$ .................... B01J 32/00; B01J 35/04
[52] U.S. Cl. ........................... 502/439; 502/527
[58] Field of Search ................. 502/439, 527; 428/593

[56] References Cited

U.S. PATENT DOCUMENTS 4,273,681  6/1981  Nonnenmann .................. 502/527 X Primary Examiner—W. J. Shine
Attorney, Agent, or Firm—Wenderoth, Lind & Ponack

[57] ABSTRACT

A catalyst carrier having a honeycomb structure made of metal sheets and used for a catalytic convertor for treating an exhaust gas of an internal combustion engine. The catalyst carrier is made of layers, each having a plain sheet, and at least one corrugated sheet applied on the plain sheet and having a width smaller than that of the plain sheet so that, laterally of the corrugated sheet, a portion of the plain sheet is not occupied by the corrugated sheet. The portion without the corrugated sheet is in face to face contact with a portion having a corrugated sheet on an adjacent layer, and as a result, a lateral engagement is obtained between the corrugated sheets of the facing layers, thereby preventing the layers from being laterally displaced along at least one direction.

12 Claims, 7 Drawing Sheets

HONEYCOMB CATALYST CARRIER

BACKGROUND OF THE INVENTION

1. Field of the Invention

The present invention relates to a catalytic convertor for an automobile, and in particular, to a carrier for supporting a catalytic material thereon. More particularly, the present invention relates to such a catalyst carrier made or metal sheets firmly joined to each other by an improved method of connecting same.

2. Description of the Related Art

A honeycomb shaped body made of ceramic material based on cordierite is currently widely used as a carrier of a catalytic material for a catalytic convertor for purifying exhaust gases discharged from an internal combustion engine of an automobile. This type of catalyst carrier, however, has a drawback in that it is very easily damaged when subjected to a mechanical shock, since it is made from a brittle ceramic material. Accordingly, a catalyst carrier has been proposed wherein a metal material is employed in place of the ceramic material.

To produce such a metal material carrier, first a sheet of a metal material such as stainless steel or an oxidation resistant high alloy steel, having a thickness of about 40 $\mu$m is obtained, and then a continuous length of a plain sheet is wound around a core while a continuous length of a corrugated sheet is fixed to the surface of the plain sheet, to thus obtain a honeycomb structure. Alternatively, a certain length of a plain sheet and a certain length of a corrugated sheet are laminated together to obtain a honeycomb structure. The obtained honeycomb structure is housed in an outer casing made of stainless steel or an oxidation resistant high alloy steel having a thickness of 1 to 2 mm. Note, during the formation of the honeycomb structure, a brazing material is applied to the sheets at portions at which the sheets are in contact with each other. Finally, the honeycomb body housed in the casing is heated in a vacuum to carry out the brazing process needed for connecting the honeycomb structure to the inner wall of the outer casing, and to connect the plain sheets and corrugated sheets to each other at portions at which these sheets are in contact with each other.

This brazing connection process makes the honeycomb structure a rigid structure, since the sheets forming the honeycomb structure are connected to each other at points along the entire length of the layers of the honeycomb structure. Nevertheless, when this structure is applied to a catalytic convertor mounted in an exhaust pipe of an automobile, stress is apt to be concentrated on the honeycomb structure at points near the outer casing, which causes a separation or cracking of the portions of the sheets in contact with one another, because the carrier is subjected to a strong thermal stress caused not only by vibration applied thereto when the vehicle is moving but also by a thermal cycle generated by a repetition of rapid heating and cooling thereof. Such a thermal stress is generated mainly by a difference in the degree of the thermal expansion of the outer casing and that of the honeycomb structure at the outer portion thereof. Therefore, to obviate this difficulty, a partially connected structure is proposed, wherein the sheets are connected at a limited number of points along the entire length of the layers of the honeycomb structure, to thus obtain a less rigid construction. This improved structure, however, has a drawback in that the process for obtaining such a structure is extremely complicated, and thus this proposal is not practical when trying to overcome the problems of the prior art. Furthermore, the prior art method is expensive, since the brazing material, and process for carrying out the brazing, are costly.

In view of the above, various methods have been proposed in order to obviate the above-mentioned difficulty. In such an improved method, in place of the brazing process, an improved means is used for connecting the layers, using a high density energy source such as a laser beam or electron beam, or an electric resistance welding process. For example, Japanese Unexamined Patent Publication No. 62-71547 discloses a method wherein a spot welding is first carried out to connect the plain sheet and the corrugated sheet, which are positioned facing each other, and then the thus-connected sheets are spirally wound on a core to thereby obtain a honeycomb structure. In this construction, rigid connections between the plain sheet and the corrugated sheet are obtained only in each of the layers constructing a honeycomb structure, and therefore, a rigid connection of the sheets is not located between the layers constructing the honeycomb structure. As a result, an axial force, applied to the honeycomb structure when placed in a flow of the exhaust gas to be treated for removal of toxic components, is created and displaces the layers in a telescopic manner. Another prior art, Japanese Unexamined Patent Publication No 64-40180, discloses an electric resistance welding process carried out by electrode units arranged in parallel, each unit comprising two electrodes arranged outside of the honeycomb structure. This method, however, has a drawback in that the welding can be carried out only on a limited area of the circumference of the core, the number of electrodes that can be arranged is limited, the welding process and winding process must be carried out alternatively and separately, and the welding can be done only intermittently, which prolongs the production time, and thus lowers the production efficiency.

SUMMARY OF THE INVENTION

An object of the present invention is to provide a catalyst carrier having a honeycomb structure made of metal sheets, which can overcome the above-mentioned drawback.

Another object of the present invention is to provide a catalyst carrier having a honeycomb structure made of metal sheets, and having a flexible structure which does not allow an axial telescopic displacement of the layers constructing the honeycomb structure when subjected to a flow of gas to be treated.

Still another object of the present invention is to provide a catalyst carrier made of metal sheets, and suffering less thermal stress when placed in contact with a high temperature gas to be treated.

A further object of the present invention is to provide a catalyst carrier having a honeycomb structure made of metal sheets, which can be used in a catalytic converter for an automobile, and which has a high durability when the honeycomb structure is housed in a casing.

According to the present invention, a catalyst carrier having a honeycomb structure is provided, the structure comprising a plurality of layers, each composed of a plain sheet and at least one corrugated sheet having a width smaller than that of the plain sheet, the corrugated sheet being fixedly connected to a surface of the plain sheet in such a manner that at least one portion not occupied by the corrugated sheet is formed laterally on the surface of the plain sheet, the arrangement of the layers being such that a face to face contact is obtained between the corrugated sheet of one layer with a portion of a plain sheet not occupied by a corrugated sheet on the facing surface of the adjacent layer, so that a mating engagement of the corrugated sheets between the adjacent layers in at least one lateral direction is created, to thereby prevent a displacement of the adjacent layers along that direction.

The sheets according to the present invention are produced from materials such as a stainless steel, aluminum, or on Fe-Cr-Al type heat resistive high-alloy metal, having a thickness of less than 100 μm, and preferably, about 50 μm. The width of the plain sheet, which corresponds to the axial length of a completed honeycomb structure, depends on the design of the product to be obtained, but is generally less than 160 mm. The width of the corrugated sheet can be as desired as long as it is narrower than that of the plain sheet.

According to the present invention, a honeycomb structure is formed by a plurality of layers, each of which is composed of a plain sheet and a corrugated sheet connected to the plain sheet, the width of corrugated sheet being smaller than that of the plain sheet. The corrugated sheet is applied in such a manner that a portion occupied by a corrugated sheet and a portion not occupied by a corrugated sheet are arranged alternately on a surface of a plain sheet, and the corrugated sheets are connected to the plain sheets by a process such as spot welding. These layers are formed from continuous sheets, to thus form a spiral honeycomb structure. Alternatively, these layers are separate from each other, and laminated together to construct a honeycomb structure. In the honeycomb structure, a face to face contact of a corrugated sheet and a plain sheet in one layer with a surface of a plain sheet not occupied by a corrugated sheet in the next layer is obtained, so that any mutual movement between the layers is prevented.

When such a honeycomb structure is obtained, any corrugated sheet in one layer is in a face to face contact with a portion of the surface of an adjacent layer not occupied by a corrugated sheet, so that the corrugated sheets between adjacent layers are laterally engaged with each other, to thus be located on the same plane, and there is no fixed connection of the sheets between the layers. Namely, a corrugated sheet in one layer is not welded to a facing plain sheet and a lateral corrugated sheet in the adjacent layer, whereby, a highly flexible construction of the honeycomb structure is obtained while preventing layers from being mutually laterally displaced in at least one direction.

It should be noted that the width of a corrugated sheet arranged on and connected to a surface of a plain sheet, i.e., the width of the portion not occupied by the corrugated sheet can, in general, have a selected value. Nevertheless, it is preferable to obtain a honeycomb structure by laminating lengths of sheets or winding continuous sheets wherein a corrugated sheet in one layer has a width which is substantially equal to the width of a portion not occupied by the corrugated sheet, in the face layer, which allows a close engagement of adjacent layers to be obtained, to thus prevent a mutual lateral movement of the layers.

A honeycomb structure can be obtained by winding a continuous plain sheet while applying and connecting a corrugated sheet to the opposite surface of the plain sheet. In this case, a corrugated sheet on one surface of the plain sheet must form a lateral portion thereof not occupied by the corrugated sheet, while the corrugated sheet on one surface of a plain sheet is aligned with a portion having the same width but not occupied by a corrugated sheet on the opposite surface of the plain sheet, so that there is no overlap of the corrugated sheets on the opposite surfaces of the plain sheet in a transverse direction thereof. This construction enables a wound type honeycomb structure which is firmly engaged to be obtained.

A honeycomb structure may be constructed also from a length of laminated sheets. In this case, as in the construction of a honeycomb structure from a continuous sheet wound in a spiral, a corrugated sheet on one surface of the plain sheet is aligned with a portion of the opposite surface not occupied by the corrugated sheet in a direction transverse to the sheet, so that there is no overlap between corrugated sheets on opposite surfaces of a plain sheet as viewed in this direction. Nevertheless a laminated construction of the honeycomb structure, a partial overlap of corrugated sheets between the opposite surfaces of a plain sheet is allowed, as long as a construction is maintained between adjacent layers wherein a corrugated sheet on one surface of one layer faces a portion not occupied by the corrugated sheets, of the same width on an opposite surface in the next layer.

According to the present invention, the rigid connection of a plain sheet and corrugated sheet can be carried out by any conventional means, such as brazing, electric resistance welding, or high density energy welding, including laser welding or electron beam. Among these means, from the viewpoint of efficiency, the electric resistance spot welding is most preferable, since the employment of electric resistance spot welding allows the welding and winding of the plain and corrugated sheets to be carried out simultaneously. Furthermore, the electron beam welding or laser welding can be carried out in the same way as spot welding, for connecting the plain and corrugated sheets. For the brazing, the plain and corrugated sheets are at first connected by brazing, and then the connected sheets are wounded into a spiral shape to obtain a honeycomb structure, or a winding process of the plain and corrugated sheets is first carried out while a brazing material is applied between the plain and corrugated sheets in each of the layers of the honeycomb structure, and then a heat treatment of the wound body is carried out in a vacuum, whereby the plain and corrugated sheets are brazed to each other.

DESCRIPTION OF THE PREFERRED EMBODIMENTS

Figure 1:
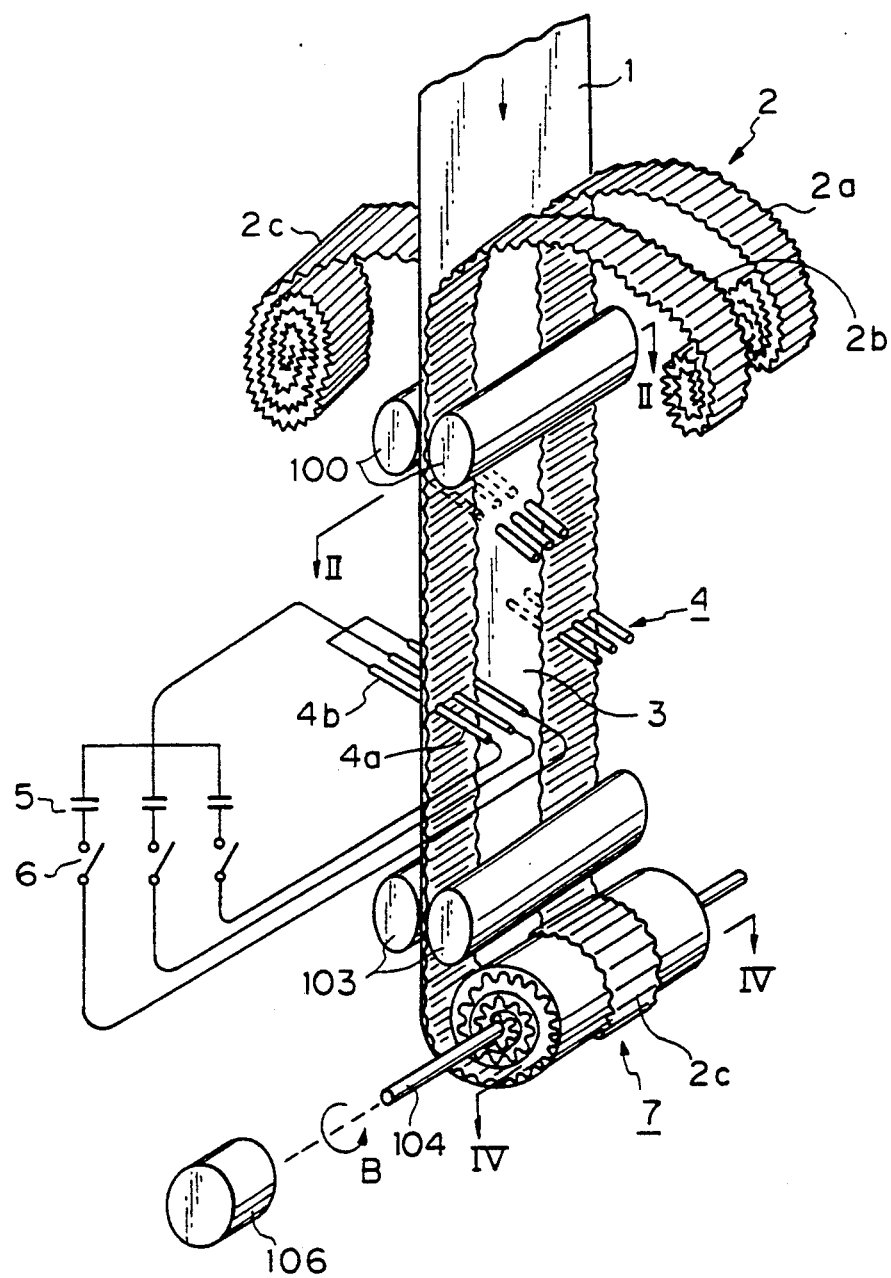
FIG. 1 is a schematic perspective view of a system for constructing a honeycomb-shaped catalyst carrier from continuous flat and corrugated sheets.

An embodiment of the present invention will be described with reference to the attached drawings, wherein FIG. 1 shows an arrangement for producing a honeycomb-shaped catalytic carrier by winding a continuous sheet, and reference numeral 1 denotes a plain sheet, which is taken from a reel (not shown), reference numerals 2a, 2b and 2c denote corrugated sheets having a width smaller than that of the plain sheet 1. The plain sheet 1 is sandwiched by corrugated members 2a and 2b on one surface of the plain sheet 1, and a corrugated sheet 2c on the opposite surface of the plain sheet 1. These sheets 1, 2a, 2b and 2c are forcibly moved downward while being guided by pairs of rollers 100, 103, and are wound on a take-up shaft (core) 104 connected to a rotating means such as an electric motor 106. The corrugated sheets 2a and 2b are applied on one surface of the plain sheet 1, in such a manner that the outer longitudinal edges of the corrugated sheets 2a and 2b are flush with the respective longitudinal edges of the plain sheet 1, whereby a longitudinally extended portion 3 is formed laterally on the surface of the plain sheet 1, inward of the corrugated sheets 2a and 2b, which portion 3 is not occupied by the corrugated sheet.

The corrugated sheet 2c is applied to the surface of the plain sheet 1 opposite the surface on which the corrugated sheets 2a and 2b are applied in the center of the width of the plain sheet 1, so that longitudinally extending portions 3' and 3" (FIG. 2) are formed laterally on the surface of the plain sheet 1 outward of the corrugated sheet 2c, which portions 3' and 3" are not occupied by a corrugated sheet.

As is easily understood, the width of each of the corrugated sheets 2a, 2b and 2c is substantially one third the width of the plain sheet 1. Furthermore, these portions 3, 3' and 3" of the surface of the plain sheet 1 not occupied by the corrugated sheet are aligned with portions of the opposite surface of the plain sheet 1 on which the corrugated sheets 2a, 2b and 2c are present. Namely, there is substantially no overlap of the corrugated members 2a and 2b on one surface and the corrugated member 2c on the opposite surface, as viewed in a direction transverse to a plane of the sheets, as will be easily seen from FIG. 2. When assembled into a honeycomb structure by winding the continuous sheets in a spiral manner, this construction allows any corrugated member in one layer to be laterally engaged with a corrugated member in the adjacent layer, which prevents the layers of the honeycomb structure from being displaced in the lateral direction, as will be fully described later.

Figure 2:
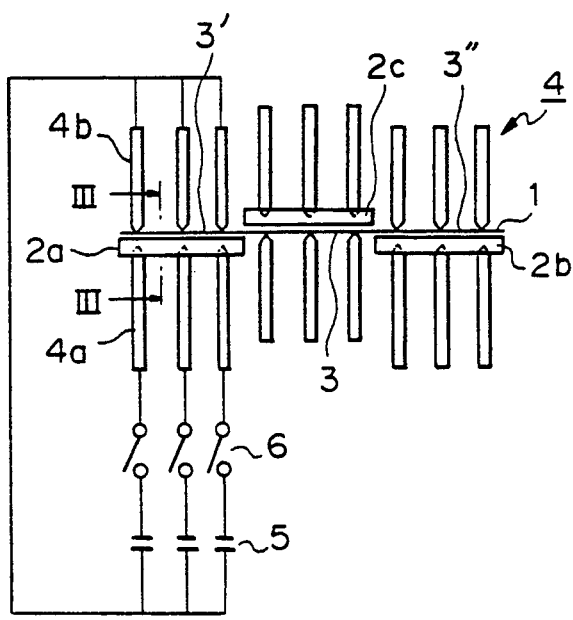
FIG. 2 shows an arrangement of a spot welding system with respect to plain and corrugated sheets, taken along the line II—II in FIG. 1.
Figure 3:
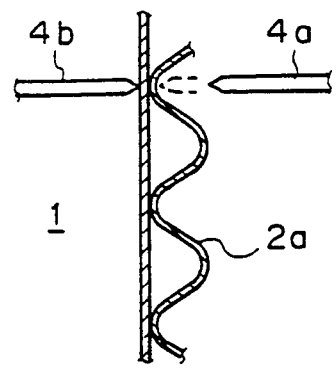
FIG. 3 shows an arrangement of a spot welding unit, taken along the line III—III in FIG. 2.

In FIG. 1, reference numeral 4 generally denotes a spot welding device having pairs of electrodes 4a and 4b between which the webs are arranged so that the electrodes 4a and 4b are capable of contact, at their tip ends, with an opposed plain sheet 1 or corrugated sheet 2a, 2b or 2c. As shown in FIGS. 2 and 3, when a spot welding is carried out each pair of electrodes 4a and 4b is connected to a power supply 5 via respective switches 6, and a closed circuit obtained by turning switches 6 ON causes an electric current to be applied across the electrodes 4a and 4b, so that a direct spot welding is carried out and the corrugated sheets 2a, 2b and 2c are thus connected to the plain sheet 1. Each of the welding devices has three horizontally spaced pairs of electrodes 4a and 4b, so that the spot welding takes place simultaneously at three horizontally spaced positions along the width of the corrugated web. Note, the number of electrode pairs is not limited to three, and is determined in accordance with the width of the corrugated sheet to be connected to the plain sheet. It should be noted that the spot welding is carried out at desired vertical locations which are suitably spaced along the entire length of the web. It should be also noted that a desired number or welding heads is provided so that they are vertically spaced.

Figure 4:
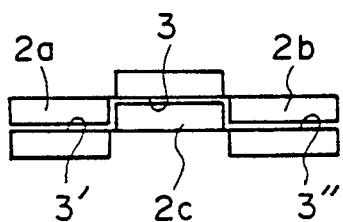
FIG. 4 shows layers of a catalyst carrier having a honeycomb structure, taken along the line IV—IV in FIG. 1.
Figure 5:
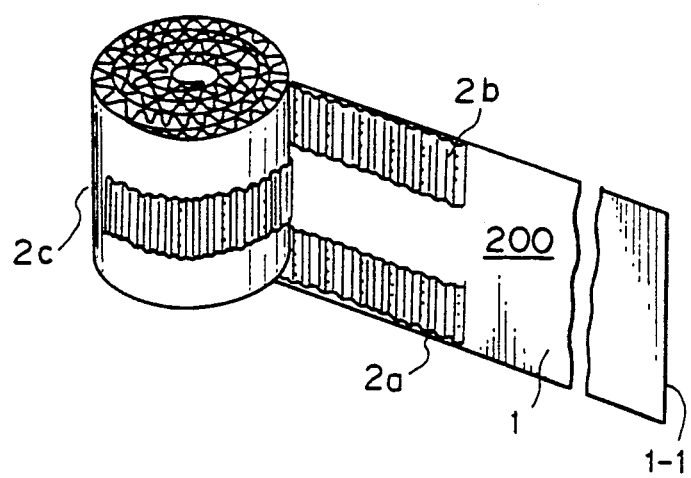
FIG. 5 shows a honeycomb structure obtained by winding continuous sheets onto a core, wherein the end portions of the sheets are shown as extended.
Figure 7:
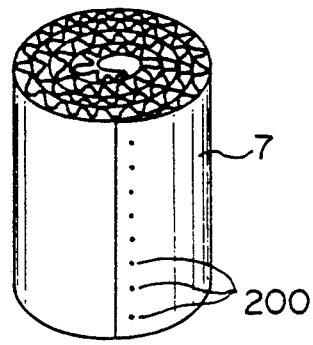
FIG. 7 shows a completed honeycomb structure as obtained from the structures shown in FIG. 5 or 6.

The sheets 1 and 2 as welded are taken up by the shaft 104 driven by the electric motor 106, so that the plain sheet 1 together with the corrugated sheets 2a, 2b and 2c spot welded to the front and rear faces thereof are wound as shown by an arrow B, to obtaining a spiral honeycomb structure wherein, as shown in FIG. 4, between adjacent layers of the honeycomb structure, a corrugated sheet 2c in an inner layer is in face to face contact with the portion 3 of the surface of the plain sheet 1 in an adjacent outer layer, and the corrugated sheets 2a and 2b in the second layer are in face to face contact with the portions 3' and 3" of the surface of the plain sheet 1 in the first layer, which allows the corrugated sheets 2a and 2b in one layer and the corrugated sheet 2c in the adjacent layer to be laterally engaged, while the layers are radially free from each other. As a result, the layers of the honeycomb structure cannot be displaced from each other even though no welding exists between the layers of the honeycomb structure. When a predetermined value of the diameter of the wound sheets is obtained, the sheets as assembled are cut transversely to obtain a honeycomb structure 7 as shown in FIG. 7. It should be noted that, as shown in FIG. 5 wherein the outer end portion of the shown are sheet as extended, the corrugated sheets 2a, 2b and 2c are cut before they reach the outermost edge of the plain sheet 1—1, so that a portion 200 not occupied by the corrugated sheet, along the entire width of the plain sheet of the length of one turn of a layer, is formed. This portion, after being completely wound as shown in FIG. 7, is connected to the adjacent layer by spot welding along portions 200, to thus obtain a complete honeycomb structure.

Figure 8:
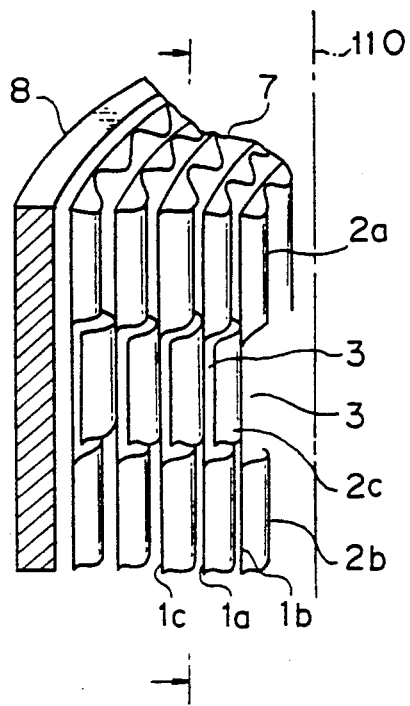
FIG. 8 is a partial view of the honeycomb structure when housed in a housing, to thus provide a catalytic convertor for a vehicle.

The thus obtained honeycomb structure 7, as shown in FIG. 8, is inserted into a cylindrical shaped housing 8, and is connected thereto by any connecting means such as brazing or welding, or by a mechanical connecting means, so that the honeycomb structure 7 cannot fall out of the housing 8. It should be noted that there is no positive connection between adjacent layers, i.e., between a plain sheet 1 in one layer and corrugated sheets 2a and 2b, and 2c in a next layer, but this construction does not cause the layers to be displaced in the direction parallel to the axis 110 of honeycomb structure 7 because the corrugated sheets 2a and 2b in the first layer are in face to face contact with portions 3' and 3" not occupied by the corrugated sheet in the next layer, and a corrugated sheet 2c in the next layer is in face to face contact with a portion 3 not occupied by a corrugated sheet in the first layer, which allows the corrugated sheets 2c, and 2a and 2b between the facing layers to be laterally engaged in both directions, and due to such a lateral engagement of the corrugated sheets of the adjacent layers, no lateral displacement of the layers occurs.

It should be noted that, in place of the direct spot welding process, any connecting means using a high density energy such as electron beam welding or laser beam welding can be employed for connecting the sheets to each other. Furthermore, brazing can be employed for fixedly connecting the plain and corrugated sheets. In this case, before winding the sheets, a brazing material is applied to the portions of the plain and corrugated sheets to be connected. A spiral shape of the sheets as obtained is subjected to a brazing process in a vacuum, so that brazing takes place between the plain sheet and corrugated sheet at positions at which they are in contact. In this construction, there is basically no fixed connection between the layers, thereby providing a flexible honeycomb structure.

Figure 6:
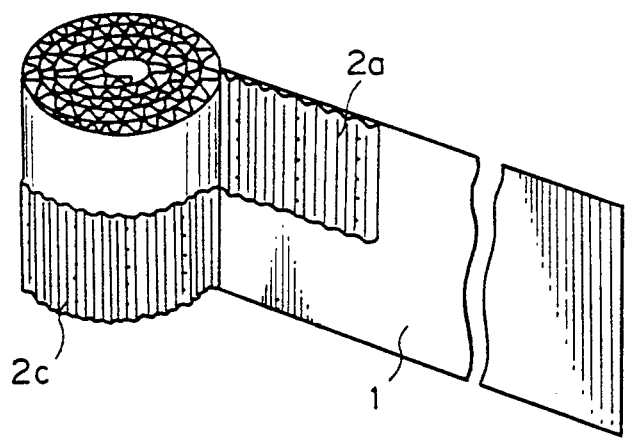
FIG. 6 is similar to FIG. 5, but only one corrugated sheet is applied on one surface of the plain sheet.

In a construction as shown in FIG. 6, a continuous corrugated sheet 2a is applied on one surface of the plain sheet, and a continuous corrugated sheet 2c is applied on the opposite surface thereof. The width of the corrugated sheets 2a and 2c is a half of the plain sheet 1. The corrugated sheets are arranged on the plain sheet 1, so that there is no overlap of the corrugated sheets 2a and 2c when viewed transverse to the plain sheet, and as a result, in a honeycomb structure obtained by winding these sheets on a core, a face to face contact of the corrugated sheets 2a and 2c with respect to portions of facing surfaces of the plain sheet not occupied by the corrugated sheet is obtained, so that a lateral engagement of corrugated sheets on adjacent layers is obtained. In this construction, however, the lateral engagement of the corrugated sheets between the adjacent layers is uni-directional. Therefore, to prevent a lateral displacement of the layers when a catalytic converter having the honeycomb structure is arranged in an exhaust pipe of an internal combustion engine, the flow of the exhaust gas from the engine must be applied to the honeycomb structure in the direction in which such a lateral engagement takes place.

It should be further noted that a construction can be provided wherein a welding between the layers is provided at a zone adjacent to the center portion of the honeycomb structure. In this case, the obtained honeycomb structure is rigid at the center portion. The honeycomb structure, however, still has a loose layer to layer structure at a peripheral zone near the housing, where a stress concentration rarely occurs, and therefore, a desired flexible characteristic is still obtained.

Figure 9:
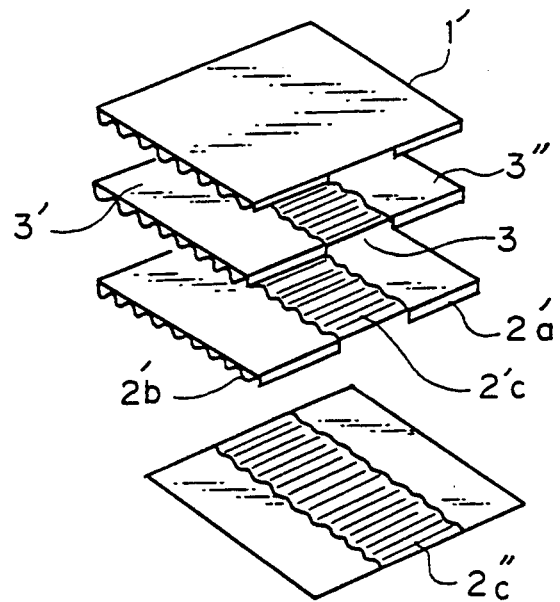
FIG. 9 is an exploded view of a construction of a honeycomb structure obtained from a length of laminated sheets.
Figure 10:
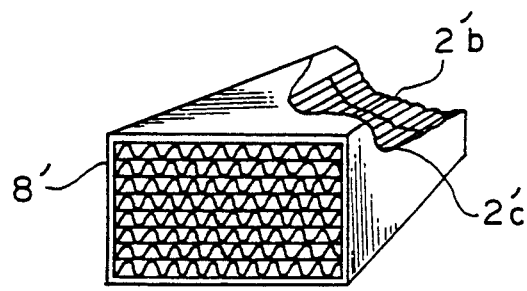
FIG. 10 is a schematic perspective view of the honeycomb structure having a laminated construction and housed in a casing having a rectangular cross sectional shape.

FIG. 9 shows another embodiment of the present invention, wherein a honeycomb structure is constructed by a lamination of lengths of sheets 1', 2'a, 2'b and 2'c. A length of plain sheet 1' is provided on opposite surfaces with lengths of corrugated sheets 2'a, 2'b and 2'c having a width smaller than that of the plain sheet 1', so that the corrugated sheet 2'c on one surface of the plain sheet 1' does not overlap the corrugated sheets 2'a and 2'b on the opposite surface of the plain sheet 1', when viewed in the direction transverse to the plane of the web, and as a result, a lamination of the webs allows a construction to be obtained wherein a face to face contact of any corrugated member in one layer with a portion not occupied by the corrugated sheet in the facing layers is obtained, so that the corrugated sheets 2'a and 2'b, and 2'c between the layers are laterally engaged, which presents the adjacent layers from being moved laterally while being free to move in a direction perpendicular to the laminated plane. The obtained laminated honeycomb structure is inserted into a housing 8' having a rectangular cross section, as shown in FIG. 10.

Figure 11:
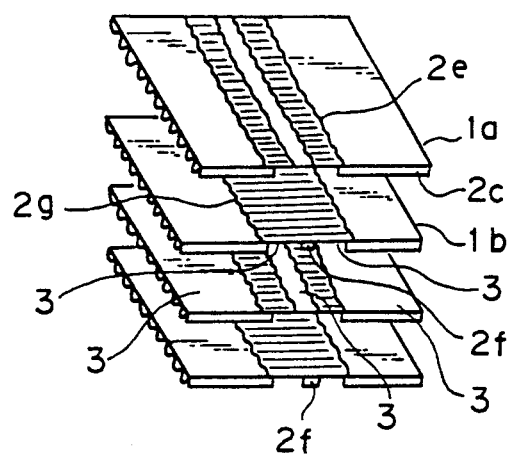
FIG. 11 is similar to FIG. 9, but showing a different embodiment.

When the honeycomb structure is obtained from the laminated structure, the corrugated sheet on one surface of the plain sheet need not always maintain a non-overlapping relationship with respect to a portion of an opposite surface of the plain sheet not occupied by the corrugated sheet. FIG. 11 shows this possibility, wherein, for the plain sheet 1a, corrugated sheet 2c on one surface partly overlap corrugated sheet 2e on the opposite surface of the plain sheet 1a. For a plain sheet 1b, a corrugated sheet 2f on one surface thereof completely overlaps a corrugated sheet 2g on the opposite surface. Even if such a construction is employed, however, between adjacent layers, a corrugated sheet in one layer must face a portion of the plain sheet of substantially the same width and not occupied by the corrugated sheet in the opposite layer.

Figure 12:
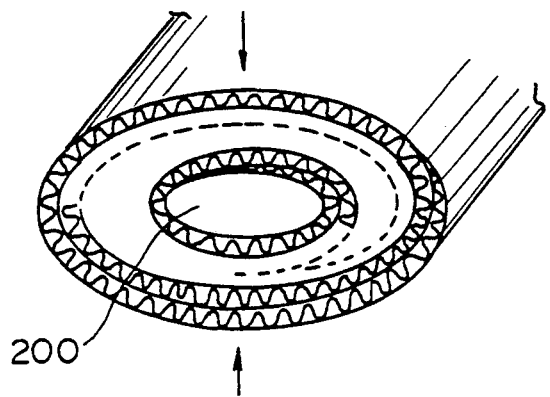
FIGS. 12 to 18 show different embodiments, where a housing has an elongated circular cross-sectional shape.
Figure 13:
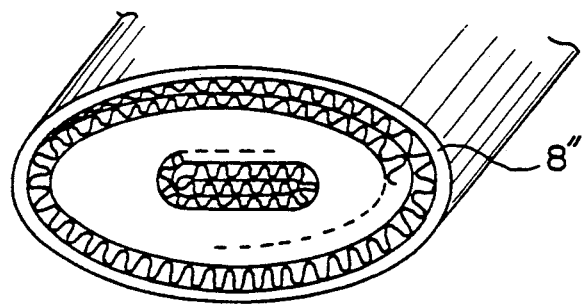
Figure 14:
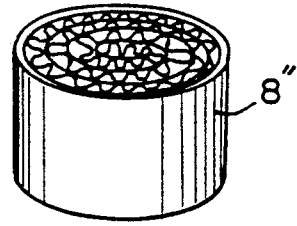
Figure 15:
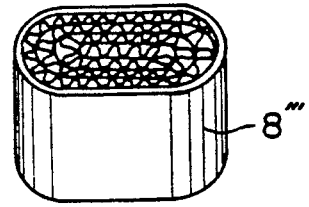
Figure 16:
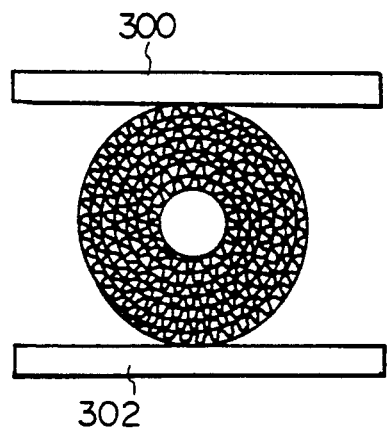
Figure 17:
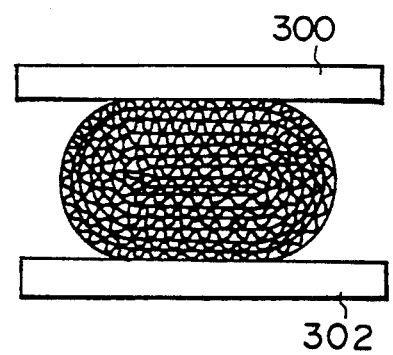
Figure 18:
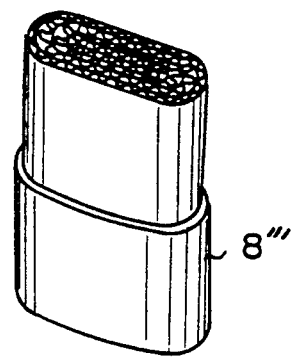

It should be noted that the housing for a carrier may have a cross-sectional shape other than the circular cross-sectional shape or rectangular cross-sectional shape, such as elliptic shapes, or race track shape. FIGS. 13 to 15 show this possibility. In FIG. 12, thin sheets as in FIG. 1, are wound on a core (not shown) to obtain a body having a central cylindrical space 200. This body is stored in a housing 8" of an elliptic cross-sectional shape as shown in FIG. 13 so that the layers are transversely collapsed to diminish the central space 200 in FIG. 12. As a result, a catalytic convertor as shown in FIG. 14 is obtained. FIG. 15 shows a catalytic convertor having a casing 8''' of cross-sectional shape of a race track. FIGS. 16 to 18 show how the catalyst carrier in FIG. 15 is obtained. A wound body is transversely collapsed by a pair of jaws 300 and 302 (FIG. 17). The collapsed body is stored in a housing 8''' having the race track shaped cross-section.

EXAMPLE 1

From a sheet made of ferrite natured stainless steel of thickness of 50 $\mu$m, including 10% of chrome and 4.5%, of aluminum, a plain sheet having a width of 120 mm and a corrugated sheet having a width of 40 mm were obtained. These sheets, as shown in FIG. 1 are assembled in such a manner that two corrugated sheets are applied on one surface of the plain sheet so that a portion 3 not occupied by a corrugated sheet is formed between the corrugated sheets 2a and 2b, and one corrugated sheet 2c is applied to the center of the opposite surface of the plain sheet, so that a portion 3 not occupied by a corrugated sheet is aligned with the corrugated sheet 2c on the other surface, as viewed transverse to the plane of the plain sheet 1. The plain and corrugated sheets were connected to each other by direct spot welding units 4.

The welding was carried out by pairs of electrodes 4a and 4b having conical shaped tip ends as shown in FIG. 3. The sheets were sandwiched between each pair of the electrodes 4a and 4b while under pressure by the electrodes. For each corrugated sheet a vertical series of pairs of electrodes were provided, to carry out the spot welding. The obtained sheets, connected to each other, were taken up to obtain a honeycomb structure as shown in FIG. 7.

The thus obtained honeycomb body 7 was inserted into an outer tubular body 8 made of SUS 304 stainless steel, and connected thereto by electrical resistance welding at suitable locations. The obtained carrier was mounted on a 3000 CC internal combustion engine, and the carrier was subjected to a durability test, wherein the engine is continuously operated for 300 hours while the temperature of the exhaust gas in maintained at 850°. A good result was obtained in that there was no axial dislocation between the outer casing and the honeycomb body, or between the layers of the honeycomb body, and no damage thereto.

EXAMPLE 2

Webs were produced from the same material as used in Example 1, and a honeycomb structure as shown in FIG. 6 obtained, wherein two corrugated sheets 2a and 2c of the same width were connected to opposite surfaces of the plain sheet so that a free space was formed on a surface of the plain sheet opposite to the other surface on which a corrugated sheet was provided. A spot welding of one corrugated sheet to the plain sheet was carried out at six points, spaced apart at the same height. The welding condition was the same as used in Example 1.

The thus obtained catalyst carrier was subjected to the same test as in Example 1, for 300 hours, and the same result was obtained.

EXAMPLE 3

Sheets were produced from the same materials as used in Example 1. As shown in FIG. 9, the sheets were cut to lengths of plain sheets and corrugated sheets. The corrugated sheets had a width one third of the plain sheet. A layer was obtained by a plain sheet and corrugated sheets welded to the surfaces of the plain sheet so that a portion 3, 3' or 3" not occupied by the corrugated sheet was formed on a surface opposite to the surface on which a corrugated sheet is arranged. The thus obtained layers were assembled in such a manner that the corrugated sheet on one surface of a layer was engaged, face to face, with a portion not occupied by a corrugated sheet on the opposite surface of a plain sheet in an adjacent layer. As a result, a stacked honeycomb construction was obtained, as shown in FIG. 10, which was housed in a tubular casing 8' having a rectangular cross sectional shape. The obtained honeycomb structure was subjected to the duration test for 300 hours, under the same conditions as in Example 1, and a good result was similarly obtained.

While embodiments of the present invention are described with reference to the attached drawings, many modifications and changes can be made by those skilled in this art without departing from the scope and spirit of the present invention.

We claim:

1. A catalyst carrier having a metal honeycomb structure comprising a plurality of layers, each comprising a plain sheet and at least one corrugated sheet having a width smaller than that of the plain sheet, said corrugated sheet being fixedly connected to a surface of the plain sheet so that, on a surface laterally of the corrugated sheet, at least one portion not occupied by the corrugated sheet is formed, which portion is aligned with a corrugated portion on the facing surface of a plain sheet in the adjacent layer, of substantially the same width, so that a face to face contact is obtained between the corrugated sheet in one layer and the portion of the plain sheet not occupied by the corrugated sheet on the facing surface of the adjacent layer, so that a mating engagement of the corrugated sheets of the adjacent layers in at least one lateral direction is created, to thereby prevent the adjacent layers from being displaced along said lateral direction.

2. A catalyst carrier according to claim 1, wherein corrugated sheets of the same width are arranged on opposite surfaces of the plain sheet in such a manner that a corrugated sheet on one surface is aligned with the portion not occupied by a corrugated sheet on the other surface, in a direction transverse to the layer.

3. A catalyst carrier according to claim 2, wherein the catalyst carrier has a cylindrical shape, the plain and corrugated sheets in all of the layers being continuous, respectively, and being wound in a spiral manner to obtain a honeycomb structure.

4. A catalyst carrier according to claim 1, wherein all of the layers are separate from each other, the separate layers being laminated in a direction transverse to the sheets to obtain a honeycomb structure.

5. A catalyst carrier according to claim 1, wherein the plain sheet and corrugated sheets are fixedly connected by spot welding at locations at which they are in contact with each other.

6. A process for producing a catalyst carrier having a metal honeycomb structure, comprising the steps of:
 providing a source of a continuous plain sheet having opposite surfaces;
 providing at least two sources of continuous corrugated sheets having a width shorter than a width of the plain sheet;
 taking out the plain and corrugated sheets from the corresponding sources so that at least one corrugated sheet is applied to each of the surfaces of the plain sheet;
 the arrangement of the plain and corrugated sheets being such that a portion not occupied by a corrugated sheet having a width substantially equal to that of the corrugated sheet forms one of the lateral surfaces of the corrugated sheet, which portion is aligned with the corrugated sheet on an opposite surface of the plain sheet,
 fixedly connecting the corrugated sheets and the plain sheet to each other at locations at which they are in contact with each other, and;
 winding the connected plain and corrugated sheets onto a core in a spiral manner to obtain a honeycomb structure, wherein a face to face contact is obtained between a corrugated sheet in one layer and a portion not occupied by a corrugated sheet on the facing surface of a plain sheet in a next layer, whereby the corrugated sheets of the layers are engaged in at least one lateral direction, and
 cutting the continuous sheet when a desired diameter of the honeycomb structure is obtained.

7. A process according to claim 6, wherein said connecting step comprises;

determining positions spaced along the length of the continuous sheets at which the plain and corrugated sheets come into contact with each other before winding the sheets on the core, and;

spot welding, at the determined positions, the plain and corrugated sheets to each other.

8. A process according to claim 6, wherein said connecting steps comprise;

applying a brazing material at locations where the plain and corrugated sheets are in contact with each other, before winding the sheets on the core, and;

subjecting the sheets as wound to heat in a vacuum, for brazing the sheets at locations where the plain and corrugated sheets are in contact with each other.

9. A process for producing a catalyst carrier of a metal honeycomb structure, comprising the steps of:

providing a length of plain sheet;

providing a length of corrugated sheet having a width smaller than that of the plain sheet;

applying the corrugated sheets onto the plain sheet to form a layer of the honeycomb structure so that a portion not occupied by a corrugated sheet is formed laterally of the plain sheet;

fixedly connecting the plain sheet and corrugated sheets in each layer, and;

laminating layers to obtain a honeycomb structure, wherein a corrugated sheet in one layer faces a portion not occupied by a corrugated sheet of substantially a same width in a next layer, so that corrugated sheets of adjacent layers with are laterally engaged with each other.

10. A catalyst carrier according to claim 1, wherein said carrier has an elongated circular cross-sectional shape.

11. A catalyst carrier according to claim 1, wherein at least two corrugated sheets are fixed on a surface of the plain sheet so that the portion not occupied by the corrugated sheets is formed between the transversely spaced corrugated sheets, with which portion the corrugated sheet in the adjacent layer is in face to face contact, so that the corrugated sheet in one layer is laterally engaged with corrugated sheets in an adjacent layer, whereby a lateral movement between adjacent layers is prevented in both directions transverse to the length of the sheets.

12. A catalyst carrier according to claim 1, wherein said carrier has an elliptical or race track shape.

* * * * *